(12) United States Patent
Kakinuma et al.

(10) Patent No.: US 8,248,574 B2
(45) Date of Patent: Aug. 21, 2012

(54) LIQUID CRYSTAL DISPLAY ELEMENT, LIQUID CRYSTAL DISPLAY DEVICE USING THE SAME, AND IMAGE DISPLAY METHOD

(75) Inventors: Takeo Kakinuma, Tokyo (JP);
Tadayoshi Ozaki, Kanagawa (JP);
Chikara Manabe, Kanagawa (JP);
Naoki Hiji, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 350 days.

(21) Appl. No.: 12/554,531

(22) Filed: Sep. 4, 2009

(65) Prior Publication Data

US 2010/0245695 A1 Sep. 30, 2010

(30) Foreign Application Priority Data

Mar. 25, 2009 (JP) ................................. 2009-073776

(51) Int. Cl.
*G02F 1/1347* (2006.01)
*C09K 19/52* (2006.01)

(52) U.S. Cl. .......................................... 349/166; 349/74

(58) Field of Classification Search ............... 349/74–83, 349/86–94, 163, 166
See application file for complete search history.

(56) References Cited

U.S. PATENT DOCUMENTS

| 2002/0176041 A1* | 11/2002 | Hisamitsu et al. ............ 349/115 |
| 2010/0060825 A1* | 3/2010 | Jang et al. ........................ 349/86 |

FOREIGN PATENT DOCUMENTS

| JP | A-10-177191 | 6/1998 |
| JP | A-10-206882 | 8/1998 |

* cited by examiner

*Primary Examiner* — Mark Robinson
*Assistant Examiner* — Michael Inadomi
(74) *Attorney, Agent, or Firm* — Oliff & Berridge, PLC (57) ABSTRACT

A liquid crystal display element includes a first substrate having a first electrode on one surface thereof, a transparent second substrate having a transparent second electrode on one surface thereof, a first liquid crystal layer containing a liquid crystal composition, a color filter, and a second liquid crystal layer containing a liquid crystal composition, and at least one of the first and second liquid crystal layers includes an additive having dielectric properties, and the dielectric constant of the first liquid crystal layer is different from that of the second liquid crystal layer.

6 Claims, 7 Drawing Sheets

FIG. 3A
PLANAR

FIG. 3B
FOCAL CONIC

FIG. 3C
HOMEOTROPIC

LIQUID CRYSTAL DISPLAY ELEMENT, LIQUID CRYSTAL DISPLAY DEVICE USING THE SAME, AND IMAGE DISPLAY METHOD

CROSS-REFERENCE TO RELATED APPLICATIONS

This application is based on and claims priority under 35 USC 119 from Japanese Patent Application No. 2009-073776 filed on Mar. 25, 2009.

BACKGROUND

1. Technical Field

This invention relates to a liquid crystal display element, a liquid crystal display device using the liquid crystal display element, and an image display method.

2. Related Art

The popularity of personal computers in recent years have promoted the growth of an information-based society as exemplified by the growth of the Internet. Together with this, the consumption of paper as documents having a short lifespan used for temporary reference to electronic information has increased. In order to preserve and protect the environment and natural resources, such as forests, and improve working environments and the like, a rewritable liquid crystal display element which can be used as an alternative to paper has been desired.

SUMMARY OF THE INVENTION

According to an aspect of the present invention, there is provided a liquid crystal display element including:

a first substrate having a first electrode on one surface thereof;

a transparent second substrate having a transparent second electrode on one surface thereof and being opposed to the first substrate such that the first electrode and the transparent second electrode are opposed to each other;

a first liquid crystal layer containing a first liquid crystal composition and disposed between the first substrate and the transparent second substrate;

a color filter disposed between the first substrate and the transparent second substrate, the color filter being disposed at a transparent second substrate side of the first liquid crystal layer; and a second liquid crystal layer containing a second liquid crystal composition and disposed between the first substrate and the transparent second substrate, the second liquid crystal layer being at a transparent second substrate side of the color filter, at least one of the first and second liquid crystal layers including an additive having dielectric properties, the dielectric constant of the first liquid crystal layer being different from that of the second liquid crystal layer.

BRIEF DESCRIPTION OF THE DRAWINGS

Exemplary embodiments of the present invention will be described in detail based on the following figures, wherein:

FIGS. 3A, 3B and 3C are schematic diagrams illustrating a relationship between the molecular alignment of cholesteric liquid crystals and the optical properties thereof, and FIGS. 3A, 3B and 3C illustrate a planar alignment, a focal conic alignment, and a homeotropic alignment, respectively;

DETAILED DESCRIPTION

Hereinafter, an exemplary embodiment of the invention will be described in detail.

<Liquid Crystal Display Element and Liquid Crystal Display Device>

The liquid crystal display element according to the present exemplary embodiment of the invention includes: a first substrate having a first electrode on one surface thereof; a transparent second substrate having a transparent second electrode on one surface thereof and being opposed to the first substrate such that the first electrode and the transparent second electrode are opposed to each other; a first liquid crystal layer containing a first liquid crystal composition and disposed between the first substrate and the transparent second substrate; a color filter disposed between the first substrate and the transparent second substrate, the color filter being disposed at a transparent second substrate side of the first liquid crystal layer; and a second liquid crystal layer containing a second liquid crystal composition, and at least one of the first and second liquid crystal layers including an additive having dielectric properties, the dielectric constant of the first liquid crystal layer being different from that of the second liquid crystal layer.

The liquid crystal display device according to the exemplary embodiment of the invention includes the liquid crystal display element of the exemplary embodiment, and a voltage applying device that applies voltage between the first and second electrodes thereof.

In the liquid crystal display element according to the exemplary embodiment of the invention, the dielectric constants of the first and second liquid crystal layers disposed between the first and second electrodes are different from each other. Therefore, when a voltage is applied between the first and second electrodes, the divided voltages applied to the respective liquid crystal layers are different from each other. This means that the divided voltages applied to the liquid crystal compositions contained in the respective first and second liquid crystal layer are different from each other.

As a result, each of the liquid crystal compositions contained the liquid crystal layers is selectively driven into focal conic alignment or planar alignment (that is, the composition undergoes a change of state between focal conic alignment and planar alignment) depending on the voltage applied between the first and second electrodes.

More specifically, the following four states can be generated by adjusting the value of a voltage applied between the first and second electrodes:

(A) a state in which the first and second liquid crystal layers are in planar alignment states;
(B) a state in which the first liquid crystal layer is in a focal conic alignment state and the second liquid crystal layer is in a planar alignment state;
(C) a state in which the first and second liquid crystal layers are in focal conic alignment states; and
(D) a state in which the first liquid crystal layer is in a planar alignment state and the second liquid crystal layer is in a focal conic alignment state.

As described above, in the liquid crystal display element according to the exemplary embodiment of the invention, the first and second liquid crystal layers are disposed such that the color filter is sandwiched therebetween. Accordingly, when the display element is observed from the transparent second substrate side thereof, the following may be observed: when the second liquid crystal layer is in a planar alignment state, light not transmitted through the color filter is observed as reflected light; when the first liquid crystal layer is in a planar alignment state, light transmitted through the color filter is observed as reflected light; and when the first and second liquid crystal layers are in focal conic alignment states, no light is reflected. In other words, the following results of observation under the four above states (A) through (D) may be obtained:

State (A): A mixed color including the color of light reflected at the planar-aligned first liquid crystal layer (light transmitted through the color filter) and the color of light reflected at the planar-aligned second liquid crystal layer (light not transmitted through the color filter) is observed.
State (B): A color including only light reflected at the planar-aligned second liquid crystal layer (light not transmitted through the color filter) is observed.
State (C): No reflected light is observed.
State (D): A color including only light reflected at the planar-aligned first liquid crystal layer (light transmitted through the color filter) is observed.

Therefore, the liquid crystal display element of the exemplary embodiment of the invention may be configured to be able to display four or more colors. This effect can be achieved even when the same type of liquid crystal composition is used in the first and second liquid crystal layers.

In the exemplary embodiment, the dielectric constants of the first and second liquid crystal layers are adjusted by adding additives having dielectric properties to the first and/or second liquid crystal layers. It is thought that adjustment of the dielectric constants of the respective liquid crystal layers can alternatively be performed using a method in which liquid crystal materials having different dielectric constants are used for liquid crystal compositions in the first and second liquid crystal layers. However, the combination of types of liquid crystal materials exhibiting different dielectric constants are limited, and when plural liquid crystal materials are mixed with one another to adjust the dielectric constant of the mixture, the liquid crystal materials may not be sufficiently compatible, which makes it difficult for the dielectric constants of the individual liquid crystal layers to be adjusted easily.

In contrast, in the liquid crystal display element of the exemplary embodiment of the invention, the dielectric constants of the individual liquid crystal layers are easily adjusted to be different values using an additive having dielectric properties added to at least one of the first and second liquid crystal layers.

Examples of the method for adjusting the dielectric constants of the first and second liquid crystal layers to different values by the addition of additives having dielectric properties include the following method:

(1) a method in which an additive is added to only one of the first and second liquid crystal layers;
(2) a method in which additives are added to the first and second liquid crystal layers in such a manner that the addition amounts thereof are different from one liquid crystal layer to the other liquid crystal layer; and
(3) a method in which the additive added to the first liquid crystal layer has a different dielectric constant from that of the additive added to the second liquid crystal layer.

The dielectric constants of the first and second liquid crystal layers can be adjusted to be different values by using any one of the three methods or a combination of two or more thereof.

As described above, in the liquid crystal display element according to the exemplary embodiment of the invention, the dielectric constants of the liquid crystal layers are adjusted by the addition of the additive having dielectric properties. Therefore, even when the same type of liquid crystal composition is used in the first and second liquid crystal layers, the liquid crystal layers have different dielectric constants.

The type of the first liquid crystal composition to be used in the first liquid crystal layer may be the same as or different from that of the second liquid crystal composition to be used in the second liquid crystal layer. Even when the types of the first and second liquid crystal compositions are different from each other, it is preferable to add an additive having dielectric properties in order to make the dielectric constants of the first and second liquid crystal layers differ from each other.

The method for adding the additive having dielectric properties to the first and/or second liquid crystal layers is not particularly limited. The first liquid crystal layer and/or the second liquid crystal preferably have a configuration in which the liquid crystal composition and the additive are dispersed in a dispersion medium (such as a polymeric dispersion medium). The liquid crystal composition may be encapsulated in microcapsules.

When the additive having dielectric properties is dispersed in the dispersion medium in the liquid crystal phase, the additive is fixed in the dispersion medium and thus may suppress display variations caused by repeatedly driving a display, compared with the case when the additive is not dispersed in the dispersion medium.

The liquid crystal layers, in which the dielectric constants thereof are adjusted as described above, preferably have an insulating property (which is defined as a volume resistivity of from $1 \times 10^6$ Ωm to $1 \times 10^{16}$ Ωm; the same definition applies hereinafter). If the liquid crystal layers are electroconductive (which is defined as a volume resistivity of $1 \times 10^{-4}$ Ωm or less; the same definition applies hereinafter), the above-mentioned change of state in the first and second liquid crystal layers disposed between the first and second electrodes may not occur when a voltage is applied between the first and second electrodes.

The ratio between the dielectric constants of the first and second liquid crystal layers (the ratio of the dielectric constant of the lower dielectric-constant layer to that of the higher dielectric-constant layer) is preferably from 1:2 to 1:10. When the ratio is within the above range, a liquid crystal display element that can display four or more colors may be easily provided.

Specific Examples of Liquid Crystal Display Element and Liquid Crystal Display Device Hereinafter, specific examples of the liquid crystal display element and the liquid crystal display device of the exemplary embodiment of the invention will be described.

Figure 1:
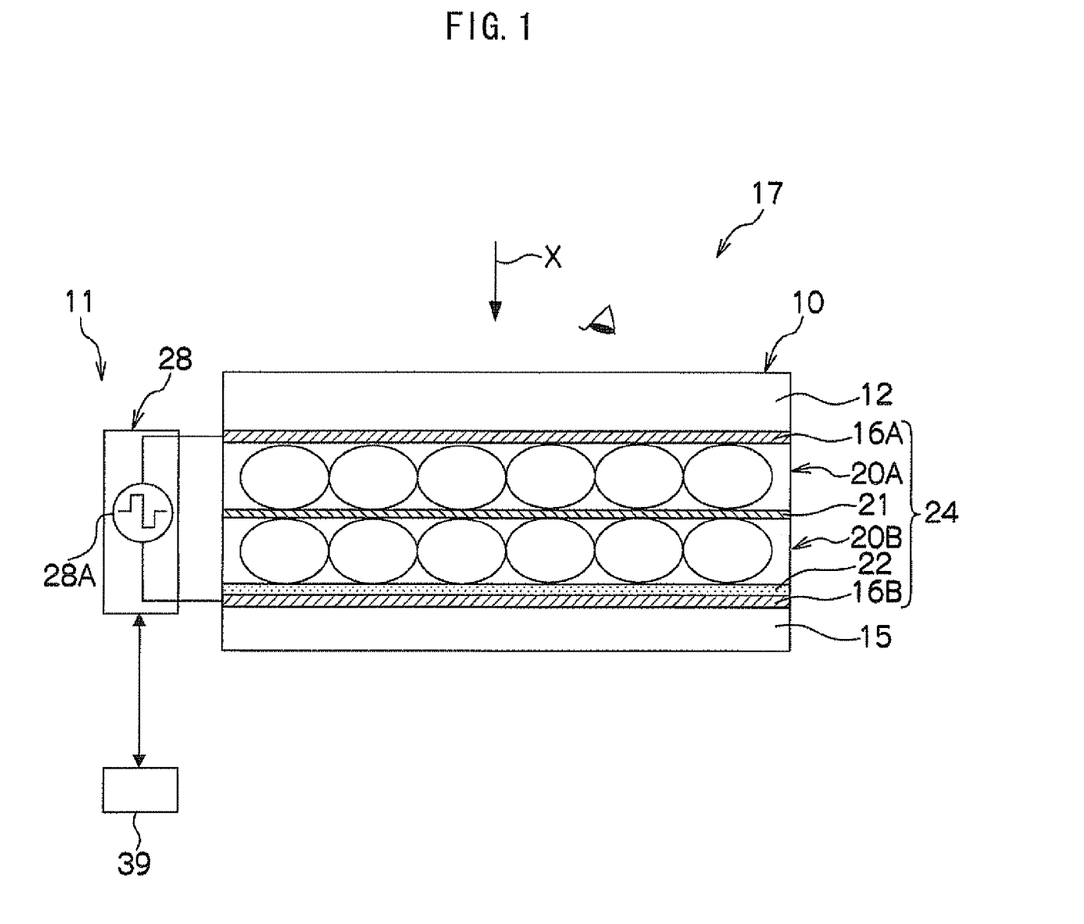
FIG. 1 is a configuration diagram illustrating an example of a liquid crystal display element and a liquid crystal display device according to an exemplary embodiment of the invention.

As shown in FIG. 1, a liquid crystal display device 17 according to the exemplary embodiment of the invention includes a liquid crystal display element 10, and a writing device 11 that writes images to the liquid crystal display element 10. An arrow X represents an observation direction.

The liquid crystal display element 10 has a configuration in which a display element 24, details of which will be described below, is disposed between substrates 12 and 15. The liquid crystal display element 10 of the exemplary embodiment of the invention may have a configuration which includes at least one display element 24, each of which contains electrodes and plural liquid crystal layers disposed between the electrodes. The display element 10 may have a configuration which includes two or more display elements, each of which may be the same as the display element 24.

The display element 24 has a configuration in which a liquid crystal layer 20A, a color filter 21, a liquid crystal layer 20B and a light-shielding layer 22 are disposed between electrodes 16A and 16B.

The liquid crystal layers 20A and 20B each have a function of switching the reflective/transmissive state of light in accordance with an applied electric field, and can maintain the selected state in the absence of an electric field. Hereinafter, the liquid crystal layers 20A and 20B are sometimes collectively referred to as a "liquid crystal layer 20".

As shown in FIG. 1, in the exemplary embodiment of the invention, the display element 24 includes, between the pair of electrodes (the electrodes 16A and 16B), the two liquid crystal layers (the liquid crystal layers 20A and 20B) disposed such that the color filter 21 is sandwiched therebetween. However, the display element is not particularly limited as long as the dielectric constants of the liquid crystal layers are adjusted to be different values by adding one or more additives thereto. For example, the display element may be a display element in which, between a pair of electrodes, liquid crystal layers, the number of which is n (n=3 or more), are disposed such that color filters, the number of which is (n−1), are disposed between the liquid crystal layers, such that no two color filters are directly adjusted.

Figure 2:
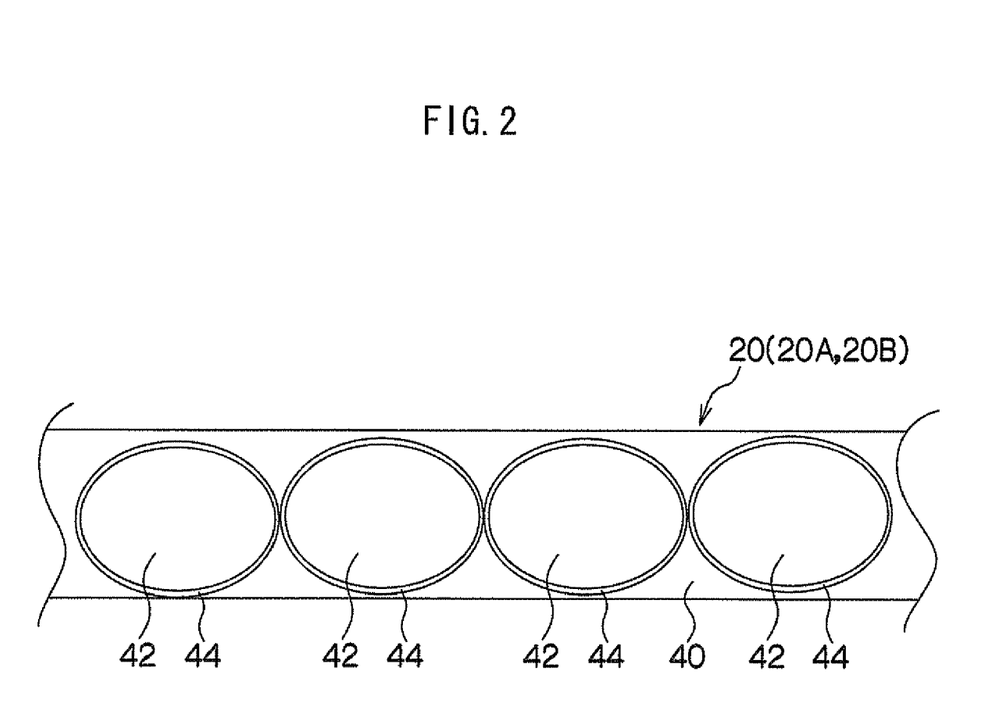
FIG. 2 is a schematic diagram illustrating an example of a liquid crystal layer according to an exemplary embodiment of the invention.

As shown in FIG. 2, the liquid crystal layer 20 may have a configuration in which a liquid crystal (liquid crystal composition) 42 is dispersed in a dispersion medium 40. The liquid crystal may be encapsulated in microcapsule 44.

Liquid Crystal

The liquid crystal 42 used in the liquid crystal layer 20 is not particularly limited as far as the liquid crystal 42 is a liquid crystal that has a function of switching the reflective/transmissive state of light in accordance with an applied electric field and can maintain the selected state in the absence of an electric field. The liquid crystal 42 may be a known liquid crystal. The liquid crystal 42 is preferably a cholesteric liquid crystal, a ferroelectric liquid crystal, or an antiferroelectric liquid crystal.

Figure 3A:
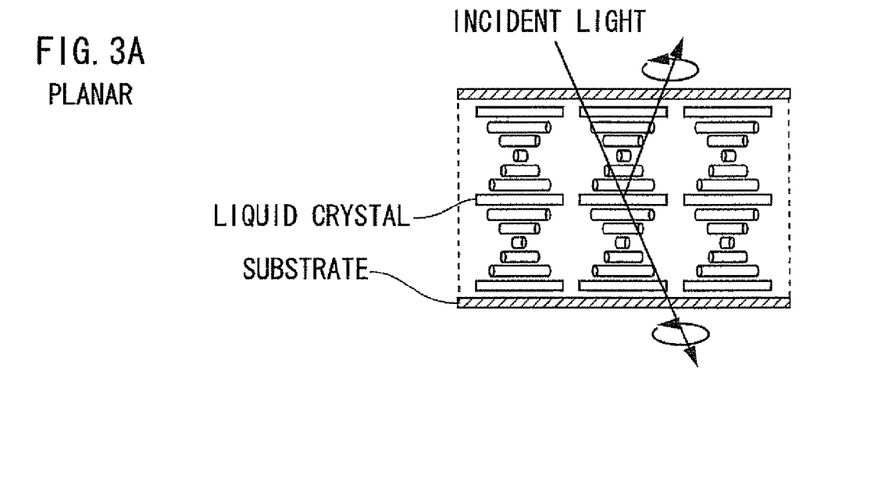
Figure 3B:
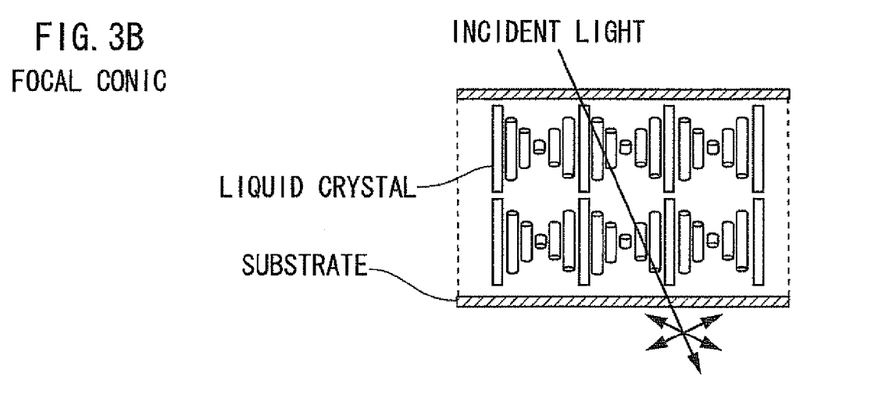
Figure 3C:
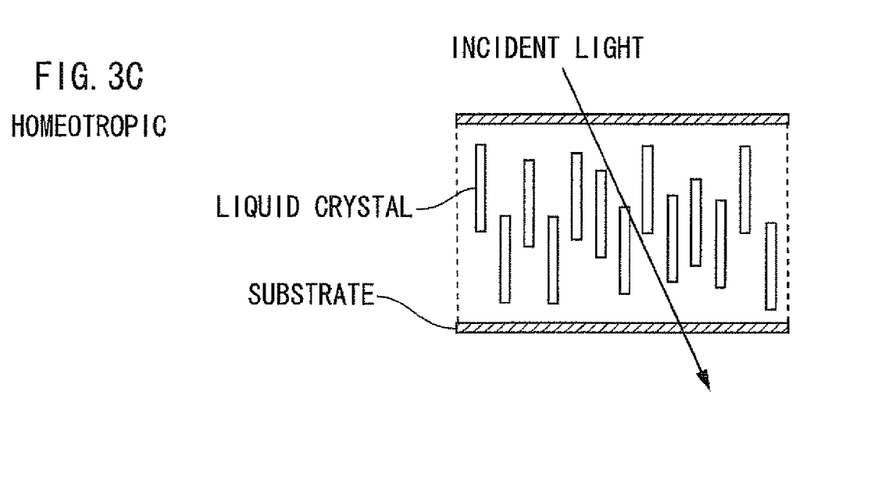

The cholesteric liquid crystal may be in a planar state as shown in FIG. 3A, in which the helical axis thereof is aligned perpendicular to the cell surfaces and the incident light is reflected described above; or may be in a focal conic state as shown in FIG. 3B, in which the helical axis thereof is substantially parallel to the cell surfaces and incident light is transmitted, a small portion of the light being scattered forwards; or may be in a homeotropic state as shown in FIG. 3C, in which the helical structure thereof is unwound and the liquid crystal director is aligned parallel to a direction of an applied electric field and incident light is substantially completely transmitted.

Of the three states, the planar state and the focal conic are bistable when no voltage is applied. Accordingly, a voltage applied between the electrodes between which the liquid crystal layer 20 is sandwiched does not completely determine which state of alignment a cholesteric liquid crystal will attain. When the initial state of the cholesteric liquid crystal is planar, the liquid crystal state is successively changed from the planar state to the focal conic state, and then to the homeotropic state as the applied voltage increases. When the initial state of the cholesteric liquid crystal is focal conic, the liquid crystal state is changed from the focal conic state to the homeotropic state as the applied voltage increases (see FIG. 4).

Figure 4:
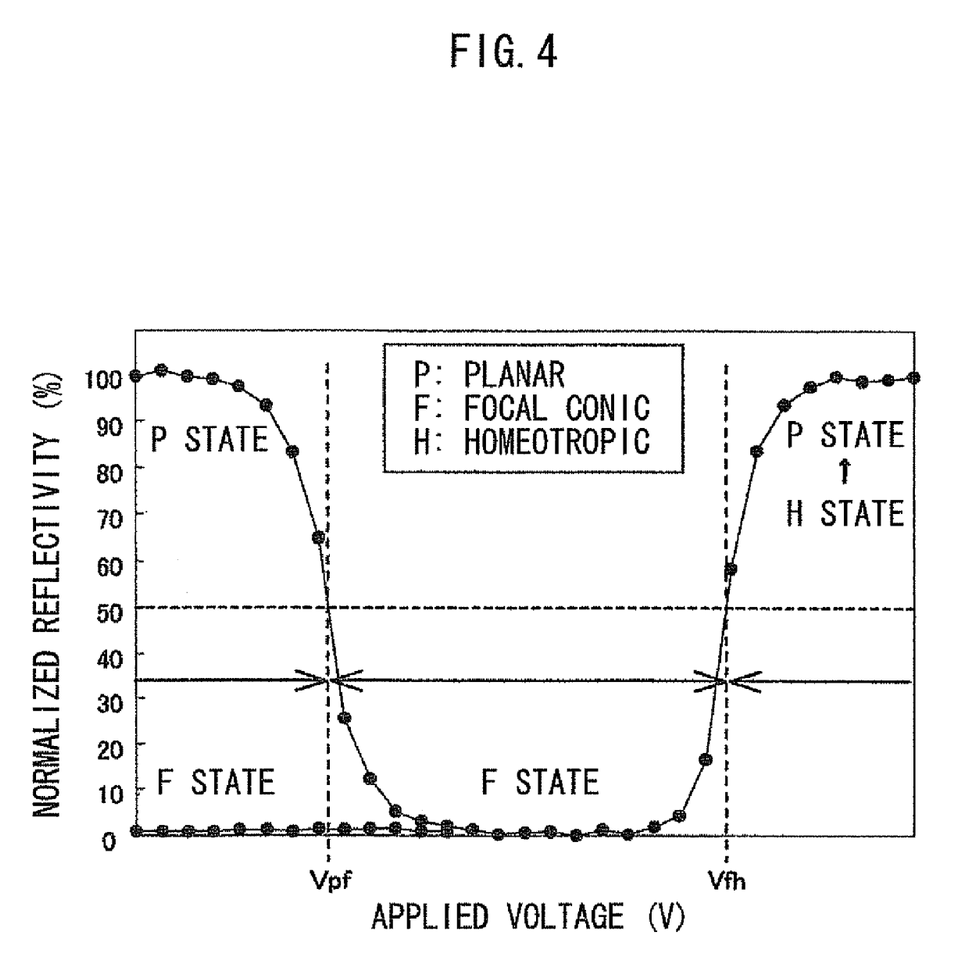
FIG. 4 is a graph showing an electro-optical response of a cholesteric liquid crystal layer.

When the divided voltage applied to the liquid crystal layer 20 is rapidly reduced to zero, the planar and focal conic states of the cholesteric liquid crystal are maintained, while the homeotropic state of the cholesteric liquid crystal is switched to the planar state (see FIG. 4). For this reason, the final phase state of the liquid crystal layer 20 will either be the planar state (reflective state) or the focal conic state (transmissive state).

More specifically, when a voltage is applied between the electrodes and then application is stopped, the divided voltages that were applied to the liquid crystal layer 20 are rapidly reduced to zero, and the liquid crystal layer 20 exhibits a switching behavior as shown in FIG. 4. When the voltage applied between the electrodes (electrodes 16A and 16B) is voltage Vfh (an upper threshold voltage) or higher, then after stopping the applied voltage, the cholesteric liquid crystal switches from the homeotropic state to the planar state, which is a selectively reflective state. When the applied voltage is voltage Vpf (a lower threshold voltage) or higher, and also lower than the voltage Vfh, the liquid crystal state changes to a focal conic state, which is transmissive state. When the applied voltage is lower than the voltage Vpf, the liquid crystal remains in the state that it was in before the voltage was applied, that is, either a planar state (reflective state) or a focal conic state (transmissive state).

In FIG. 4, the vertical axis represents the normalized light reflectivity. The light reflectivity is normalized by setting the maximum light reflectivity and the minimum light reflectivity to 100 and 0, respectively. Since switching region is present for each of the planar, focal conic and homeotropic states, a state in which the normalized light reflectivity is 50 or more is defined as a selectively reflective state and a state in which the normalized light reflectivity is less than 50 is defined as a transmissive state. The voltage of the threshold for changing between the planar and focal conic states is defined as the lower threshold voltage Vpf, and the voltage of the threshold for changing between the focal conic and homeotropic states is defined as the upper threshold voltage Vfh.

In the exemplary embodiment, the phrases "threshold for changing between the planer and focal conic states" and "threshold for changing between the focal conic and homeotropic states" denote the lower threshold voltage Vpf and the upper threshold voltage Vfh, respectively.

The cholesteric liquid crystal is a liquid crystal material containing an optically-active compound, and is obtained by, for example, (1) a method of adding, for example, an optically-active compound referred to as a chiral dopant into a nematic liquid crystal, or (2) a method of using a liquid crystal material which itself is optically-active such as a cholesterol derivative. In the former case, examples of a material for the nematic liquid crystal include known nematic liquid crystal-containing compositions such as cyanobiphenyls, phenyl cyclohexanes, phenyl benzoates, cyclohexyl benzoates, azomethines, azobenzenes, pyrimidines, dioxanes, cyclohexyl cyclohexanes, stilbenes, and tolans. Examples of the chiral dopant include cholesterol derivatives and compounds having an optically-active group such as a 2-methylbutyl group.

The cholesteric liquid crystal may contain an additive such as a dye or particles. The cholesteric liquid crystal may be a gel prepared by using a crosslinkable polymer or a hydrogen-bonding gelling agent. The cholesteric liquid crystal may be either a high-molecular-weight liquid crystal, middle-molecular-weight liquid crystal, or low-molecular-weight liquid crystal, or may be a mixture thereof. The helical pitch of the cholesteric liquid crystal may be changed according to the type or addition amount of the chiral dopant, or the material of the liquid crystal. The wavelength of the selective reflection may be in the visible wavelength range, ultraviolet wavelength or infrared wavelength range.

In the exemplary embodiment, the liquid crystals may be made into particles and then dispersed into the dispersion medium 40.

Examples of the method for making the liquid crystal particle include a method in which a dispersed phase including at least a cholesteric liquid crystal is emulsified and dispersed by dropwise addition into a continuous phase which is incompatible with the dispersed phase such as a water phase. Examples of the method for the emulsification include: a method in which the dispersed phase and the continuous phase are mixed with each other, and then the dispersed phase is dispersed into fine droplets by mechanical shearing force using a homogenizer or the like; a membrane emulsifying method in which the dispersed phase is extruded into the continuous phase through a porous membrane to disperse as fine droplets; and a microchannel emulsification method. Among these, the membrane emulsification method and the microchannel emulsification method are preferable since liquid crystal drops with reduced variation in the particle diameter of emulsified droplets may be formed thereby. During the emulsification, a surfactant or protective colloid may be mixed into the continuous phase to stabilize emulsification.

Microcapsules

In the exemplary embodiment, the liquid crystal 42 may be encapsulated in the microcapsule 44. Examples of a material for the microcapsule include a polymeric material.

Examples of the polymeric material constituting the microcapsule 44 include polyvinyl acetal resins such as polyvinyl butyral resin, polyvinyl formal resin and partially acetalized polyvinyl butyral resin where some of the butyral structures are modified to formal, acetoacetal or the like; polystyrene resins obtained by polymerization of styrene, methyl styrene, dimethylstyrene, trimethylstyrene or ethylstyrene; polymers of methacrylic acid ester such as polymethyl methacrylate, polyethyl methacrylate, polybutyl methacrylate, poly-2-ethylhexyl methacrylate and polylauryl methacrylate; polyarylate resin (such as a polycondensate made from bisphenol A and phthalic acid), polycarbonate resin, polyester resin, modified ether-type polyester resin, phenoxy resin, polyvinyl chloride resin, polyvinylidene chloride resin, polyvinyl acetate resin, urea-formaldehyde resin, melamine-formaldehyde resin, acrylic resin, methacrylic resin, polyacrylamide resin, polyamide resin, polyvinyl pyridine resin, cellulose resin, polyurethane resin, coumarin resin, terpene resin, phenol resin, melamine resin, epoxy resin, silicone resin, polyvinyl alcohol resin, polyvinyl pyrrolidone resin; vinyl chloride/vinyl acetate copolymers such as vinyl chloride/vinyl acetate copolymer, hydroxyl-modified vinyl chloride/vinyl acetate copolymer, carboxyl-modified vinyl chloride/vinyl acetate copolymer, and vinyl chloride/vinyl acetate/maleic anhydride copolymer; styrene/butadiene copolymer, vinylidene chloride/acrylonitrile copolymer, styrene-alkyd resin, silicone-alkyd resin, phenol-formaldehyde; and polypeptides such as gelatin. These polymeric materials may be used singly, or in combination of two or more kinds thereof.

Among these resins, polyurethane resin and melamine resin are preferably used.

The method for encapsulating the liquid crystal 42 into the microcapsule 44 made of the polymeric material as described above may be a microencapsulating method.

Examples of the microencapsulating method include: (1) a phase separation method in which the liquid crystal 42 is dispersed in a polymer solution, and then the solution is subjected to phase separation to form a film (microcapsule 44) on the surfaces of drops of the liquid crystal 42; (2) an in-liquid drying method in which a polymer and the liquid crystal 42 are dissolved in a cosolvent, the solution is dispersed in an aqueous phase solution, and the cosolvent is evaporated; (3) an interfacial polymerization method in which a mixed solution (organic phase solution) of the liquid crystal 42 and an oil-soluble monomer A is dispersed in an aqueous phase, to which a water-soluble monomer B is added to react with the oil-soluble monomer A through interfacial polymerization, thereby forming a film (microcapsule 44); and (4) an in situ polymerization method in which a monomer is dissolved in the liquid crystal 42 or an aqueous phase solution, and polymerized by heating or the like to form a film (microcapsule 44) through deposition of a polymer.

Phase Separation Method

Examples of the phase separation method include: a complex coacervation method in which an aqueous polymer solution containing two kinds of water-soluble polymers (for example, gelatin and gum arabic, protein and polysaccharide, protein and protein, protein and nucleic acid, or polysaccharide and nucleic acid) constituting the microcapsule 44 is separated into a dense phase and a dilute phase by controlling the pH or temperature; and a simple coacervation method in which a water-compatible organic solvent (for example, alcohol or acetone) is added into a solution of a water-soluble polymer for constituting the microcapsule 44 such as polyvinyl alcohol, gelatin, or alkyl cellulose, and then subjected to phase separation.

In-Liquid Drying Method

The in-liquid drying method is conducted, for example, by dissolving a polymer for constituting the microcapsule 44 together with a liquid crystal in a solvent having low boiling temperature, dispersing the solution in an aqueous phase solution, and then evaporating the solvent by heating or under reduced pressure.

Interfacial Polymerization Method

In the interfacial polymerization method, examples of the oil-soluble monomer A include polyvalent compounds having, within a molecule thereof, plural functional groups such as an acid halide group, a haloformate group, an isocyanate group, an isothiocyanate group, a ketene group, a carbodiimide group, an epoxy group, a glycidyl ether group, an oxazoline group, an ethylene imine group, or a lactone group. Examples of the water-soluble monomer B include polyvalent compounds having, within a molecule thereof, plural functional groups such as an amine group, an alcohol group, a carboxylic acid group, a mercaptan group, or a phenol group.

In Situ Polymerization Method

Examples of the in situ polymerization method include: (1) a method of polymerizing an oil-soluble monomer A and monomer C; and (2) a method of using a monomer D, such as a radical polymerizable monomer, which can polymerize by itself. Examples of the monomer A of method (1) include the same monomers as those described as examples of the monomer A used in the interfacial polymerization method, and examples thereof include polyvalent compounds having, within a molecule thereof, plural functional groups such as an acid halide group, a haloformate group, an isocyanate group, an isothiocyanate group, a ketene group, a carbodiimide group, an epoxy group, a glycidyl ether group, an oxazoline group, an ethylene imine group, or a lactone group. Examples of the monomer C include polyvalent compounds having, within a molecule thereof, plural functional groups such as an amine group, an alcohol group, a carboxylic acid group, a mercaptan group, or a phenol group. Examples of the monomer D of method (2) include polyvalent epoxy compounds; polyvalent isocyanate compounds; and unsaturated carbohydrate compounds such as styrene, isoprene, butadiene, vinyl chloride, vinylidene chloride, acrylonitrile, acrylic acid derivatives, and methacrylic acid derivatives. In order to form a wall material in the aqueous phase, a water-soluble monomer such as melamine or formaldehyde may be used.

Dispersion Medium

The dispersion medium 40 is preferably a material having a function of fixing the liquid crystal 42 and suppressing the fluidization of the liquid crystal 42 (suppressing a change in an image) caused by a deformation of the liquid crystal display element 10. The material is preferably a polymeric material which is not dissolved in constituent materials for liquid crystal 42 but is dissolved in a solvent incompatible with the constituent materials. The dispersion medium 40 is preferably a transparent material having a strength that can resist external force.

Examples of the dispersion medium 40, which has the above-mentioned properties, include water-soluble polymeric materials such as gelatin, polyvinyl alcohol, cellulose derivatives, polyacrylic-acid-based polymers, ethyleneimine, polyethylene oxide, polyacrylamide, polystyrene sulfonates, polyamidine and isoprene-based sulfonic acid polymers; materials that can be made into an aqueous emulsion such as fluorine resin, silicone resin, acrylic resin, urethane resin and epoxy resin; resins such as polyester resin, polyamide resin, olefin resin, vinyl resin, phenol resin and urea resin; and glass and ceramics.

The dispersion medium 40 may be used in the form of a precursor thereof, as well as in the form of a final product. For example, when the dispersion medium 40 is a resin, the dispersion medium 40 may be used in the form of a monomer or oligomer. When the dispersion medium 40 is glass or a ceramic, the dispersion medium 40 may be used in the form of a sol-gel material such as a metal alkoxide. In these cases, after the application of constituent materials of the liquid crystal layer 20 onto a substrate in the formation of the liquid crystal display element 10, the resultant may be subjected to a curing treatment, such as heating, ultraviolet ray irradiation or electron beam irradiation treatment, thereby converting the precursor of the dispersion medium 40 into a final product.

Additive Having Dielectric Properties

As described above, in the liquid crystal display element 10 according to the exemplary embodiment of the invention, the dielectric constants of the liquid crystal layers 20A and 20B, which are the layers disposed between the pair of electrodes (the electrodes 16A and 16B), are different from each other.

In the exemplary embodiment of the invention, in order to adjust the dielectric constants of the liquid crystal layers disposed between the pair of electrodes to be different from each other, the additive having dielectric properties (hereinafter, sometimes referred to as a "dielectric material") is added to at least one of the liquid crystal layers 20A and 20B. Specifically, the dielectric constants of the liquid crystal layers 20A and 20B are adjusted to be different values by adjusting the kinds or contents of the dielectric material contained in at least one of the plural liquid crystal layers 20 (liquid crystal layers 20A and 20B) disposed between the pair of electrodes.

The dielectric constants of the plural liquid crystal layers (liquid crystal layers 20A and 20B) may be adjusted to be different values by adding a dielectric material into each of the liquid crystal layers disposed between the pair of electrodes, while adjusting the addition amount or kind of the dielectric material layer by layer; or by adding a dielectric material into only one of the liquid crystal layers.

The additive "having dielectric properties" as referred herein is a material having a higher dielectric constant than that of the liquid crystal compositions contained in the liquid crystal layers 20A and 20B. Specifically, the dielectric constant of the material is preferably $8.854 \times 10^{-10}$ F/m or more (or about $8.854 \times 10^{-10}$ F/m or more).

The following describes a method for measuring the dielectric constants of the liquid crystal layers 20A and 20B, and the dielectric constant of the dielectric material. The dielectric constants are determined by the following method, and the dielectric constant in the present specification is represented by a value obtained by the method.

The dielectric constant is determined by using an ordinary impedance meter or LCR meter. A sample is kept at a measuring temperature and the transient current is measured at varied frequencies, and the measured values are regressed to an equivalent circuit so as to calculate the electrostatic capacity. The dielectric constant is calculated from the value of the electrostatic capacity, the film thickness and the area.

Specific examples of the additive having dielectric properties (the dielectric material) include barium titanate ferroelectric materials such as $BaTiO_3$; $SrTiO_3$; $CaSnO_3$; $BaSnO_3$; $BaZrO_3$; lead zirconate titanate materials; $TiO_2$; $MgTiO_3$; $HfO_2$; and a Rochelle salt. Among these materials, barium titanate ferroelectric materials are preferable since the dielectric constants thereof are very high.

The particle diameter of the dielectric material is important. If the particle diameter of the dielectric material is large, the transparency of the resultant liquid crystal layer 20 is lost. Therefore, the volume-average particle diameter of the dielectric material is preferably from 5 nm to 100 nm (or preferably from about 5 nm to about 100 nm). When the particle diameter is in this range, light-scattering by the dielectric material may be suppressed.

The volume-average particle diameter of the dielectric material is determined based on a measurement of the diameters of the particles contained in the dielectric material dispersion by a dynamic light scattering method using NANOTRAC particle size analyzer UPA-EX150 (manufactured by NIKKISO CO., LTD.). A sample to be measured is prepared by diluting 10 μL of the dielectric material dispersion with 10 mL of water. The measurement is conducted at 25° C.

The method for adding the dielectric material to the liquid crystal layer 20A and/or the liquid crystal layer 20B is preferably a method in which the dielectric material is dispersed in the dispersion medium 40. The method for dispersing the dielectric material into the dispersion medium 40 may be any one of the ordinary dispersing methods.

In order to obtain the liquid crystal layer 20 having a higher dielectric constant, it is preferable to add a large amount of the dielectric material to the dispersion medium 40. Nonetheless, it is preferable to adjust the addition amount within such a range that transparency of the liquid crystal layer 20 itself is not lost.

Specifically, the content of the dielectric material in the liquid crystal layer 20 is preferably 80% or less (volume to volume ratio), more preferably 20% or less (volume to volume ratio), based on the volume of the liquid crystal layer 20.

Method for Forming the Liquid Crystal Layer

Examples of the method for forming the liquid crystal layer 20 include printing methods such as screen printing, letterpress printing, intaglio printing, lithographic printing and flexography; and coating methods such as spin coating, bar coating, dip coating, roll coating, knife coating, and die coating. A printing machine, a coating machine or the like that is suitable for a method to be used may be selected depending on the method.

The layer thickness of the liquid crystal layer 20 is preferably 5 μm to 30 μm.

Color Filter

The color filter 21 is a "filter that can absorb light in a certain wavelength regions in the visible light region", and that can transmit light in other wavelength regions, such that the light transmitted through the color filter is a light having a specific color.

The color filter 21 may be an acrylic resin colored with a pigment or dye or a gelatin membrane colored with a pigment or dye.

Specifically, examples of the material for forming the color filter include a mixture of an alkali-soluble polymer, a photopolymerization initiator and a photopolymerizable acrylic monomer.

Examples of the pigment or dye, with which the raw material of the color filter is colored, include C.I. Pigment series (manufactured by DIC).

The method for forming the color filter may be a known method such as a method in which a coating solution for forming a color filter is applied and dried, the coating solution containing the above material. Examples of the coating solution for forming a color filter include commercially available products such as PD series (manufactured by Hitachi Chemical Co., Ltd.).

Substrates

The substrates 12 and 15 have insulating property. At least the substrate 12 is transparent (that is, light transmittance of the substrate 12 is 80% or more in the wavelength region of 380 nm to 780 nm).

Preferable examples of the substrates 12 and 15 include an inorganic sheet made of glass, silicone or the like; and a polymeric sheet made of polyethylene terephthalate, polysulfone, polyethersulfone, polycarbonate, polyethylene naphthalate, or the like.

Electrodes

The electrode 16A and 16B each have electroconductivity (which is defined as a volume resistivity of 2000 Ωcm or less, the same definition applies to the following). At least the electrode 16A is transparent.

Each of the electrodes 16A and 1613 may be made of an electric conductive material, for example, ITO (indium tin oxide), a metal film such as a Au film, an oxide film such as a $SnO_2$ or ZnO film, or an electroconductive polymer film such as a polypyrrole film. The electrodes 16A and 16B may be formed by sputtering, printing, CVD, vapor deposition, or the like.

Light-Shielding Layer

When an image is displayed in the liquid crystal layer 20 sandwiched between the electrodes 16A and 16B, the light-shielding layer 22 optically separates external light incident on the liquid crystal display element 10 from the non-display surface side (the side of the liquid crystal display element 10 that is opposite to the arrow X side in FIG. 1) form the displayed image, so as to suppress the deterioration in image quality.

For the light-shielding layer 22, materials which absorb light from an external light source, incident light, ambient light, or the like may be used. Examples of the materials include resin coloring materials such as a resin in which a pigment is dispersed, a resin in which a dye is dissolved, and a resin colored with a dye.

In the display element 24 of the liquid crystal display element 10 constructed as described above, a voltage applying device 28 is controlled through a control unit 39 (a frequency controlling device). When a voltage is applied from a voltage applying unit 28A of the voltage applying device 28 between the electrodes 16A and 16B via these electrodes, the respective layers disposed between the electrodes 16A and 1613 receive their corresponding divided voltages. At this time, in the exemplary embodiment, the dielectric constants of the liquid crystal layers 20A and 20B, the plural liquid crystal layers disposed between the electrodes 16A and 1613, are different from each other, as described above. Therefore, the value of the divided voltage applied to the liquid crystal layer 20A is different from that of the divided voltage applied to the liquid crystal layer 20B.

Figure 5:
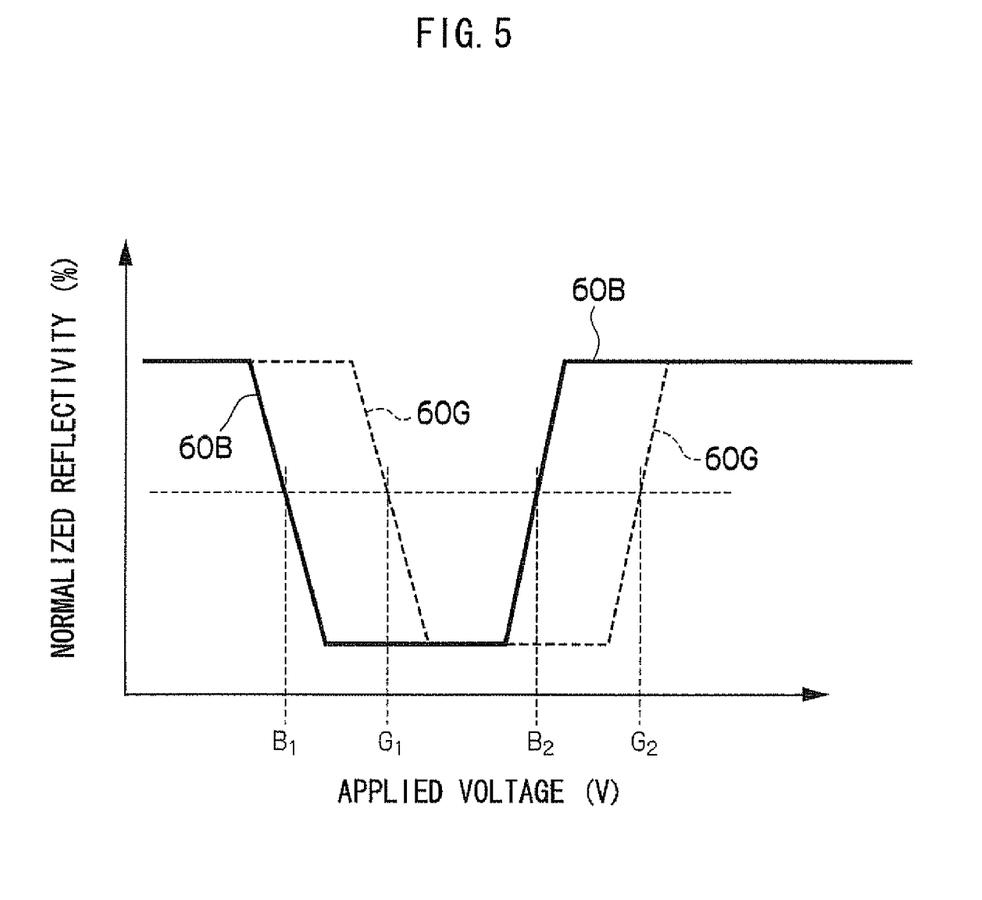
FIG. 5 is a graph showing the relationship between a voltage applied between a pair of electrodes and the normalized light reflectivities at individual liquid crystal layers.

For example, when the above-descried dielectric material is contained only in the liquid crystal layer 20B among the liquid crystal layers 20A and 20B, the relationship between the voltage applied between the electrodes 16A and 16B and the normalized light reflectivity at the liquid crystal layer 20A in the liquid crystal display element 10 is represented by a line 60B shown in FIG. 5, and the relationship between the voltage applied between the electrodes 16A and 16B and the normalized light reflectivity at the liquid crystal layer 20B in the liquid crystal display element 10 is represented by a line 60G shown in FIG. 5.

Specifically, if the same type of liquid crystal is used for the liquid crystal compositions of the liquid crystal layers 20A and 20B, and dielectric materials are not added to adjust dielectric constants thereof, it is thought that the upper threshold values, each of which is a threshold for changing between the focal conic and homeotropic states, are equal to each other in the liquid crystal layers 20A and 20B, and that the lower threshold values, each of which is a threshold for changing between the planar and focal conic states, are also equal to each other in the liquid crystal layers 20A and 20B.

On the other hand, in the liquid crystal display element 10 according to the exemplary embodiment of the invention, the dielectric constant of the liquid crystal layer 20A and that of the liquid crystal layer 2013 are adjusted to be different from each other by adding one or more dielectric materials. As shown in FIG. 5, the voltage value $G_2$ corresponding to the upper threshold value (the threshold for changing between the focal conic and homeotropic states) in the liquid crystal layer 20B, the dielectric constant of which is adjusted to be a higher value than that of the liquid crystal layer 20A by the addition of a dielectric material, is different from voltage value $B_2$ corresponding to the upper threshold value (the threshold for changing between the focal conic and homeotropic states) in the liquid crystal layer 20A, to which no dielectric material is added (in FIG. 5, the relationship therebetween is $B_2<G_2$). Further, the difference between these threshold values can be easily increased.

As shown in FIG. 5, the voltage value $G_1$ corresponding to the lower threshold value (the threshold for changing between the planar and focal conic states) in the liquid crystal layer 20B, the dielectric constant of which is adjusted to be a higher value than that of the liquid crystal layer 20A by the addition of a dielectric material, is different from voltage value $B_1$ corresponding to the lower threshold value (the threshold for changing between the planar and focal conic states) in the liquid crystal layer 20A, to which no dielectric material is added (in FIG. 5, the relationship therebetween is B1<G1). Further, the difference between these threshold values can be easily increased.

Accordingly, by controlling the value of the voltage applied between the electrodes 16A and 16B, each of the liquid crystal compositions contained in the liquid crystal layers 20A and 20B is selectively driven into focal conic alignment or planar alignment (that is, the composition undergoes a change of state between focal conic alignment and planar alignment). That is, the following four states can be generated by adjusting the value of the voltage applied between the first and second electrodes:

(A) a state in which the first and second liquid crystal layers are in planar alignment states;
(B) a state in which the first liquid crystal layer is in a focal conic alignment state and the second liquid crystal layer is in a planar alignment state;
(C) a state in which the first and second liquid crystal layers are in focal conic alignment states; and
(D) a state in which the first liquid crystal layer is in a planar alignment state and the second liquid crystal layer is in a focal conic alignment state.

Figure 6:
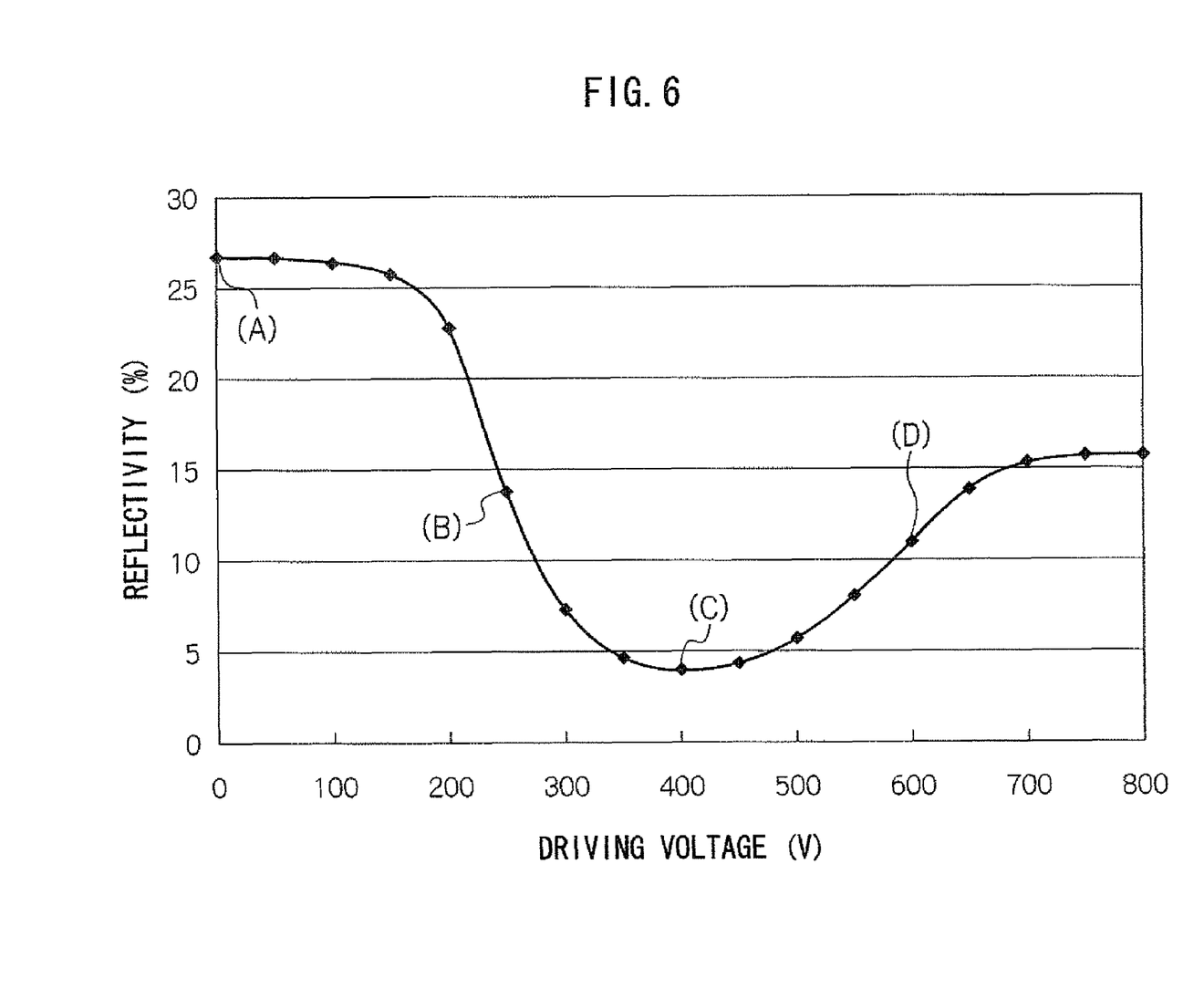
FIG. 6 is a graph showing the relationship between a voltage applied between a pair of electrodes and the light reflectivity according to an exemplary embodiment of the invention.
Figure 7:
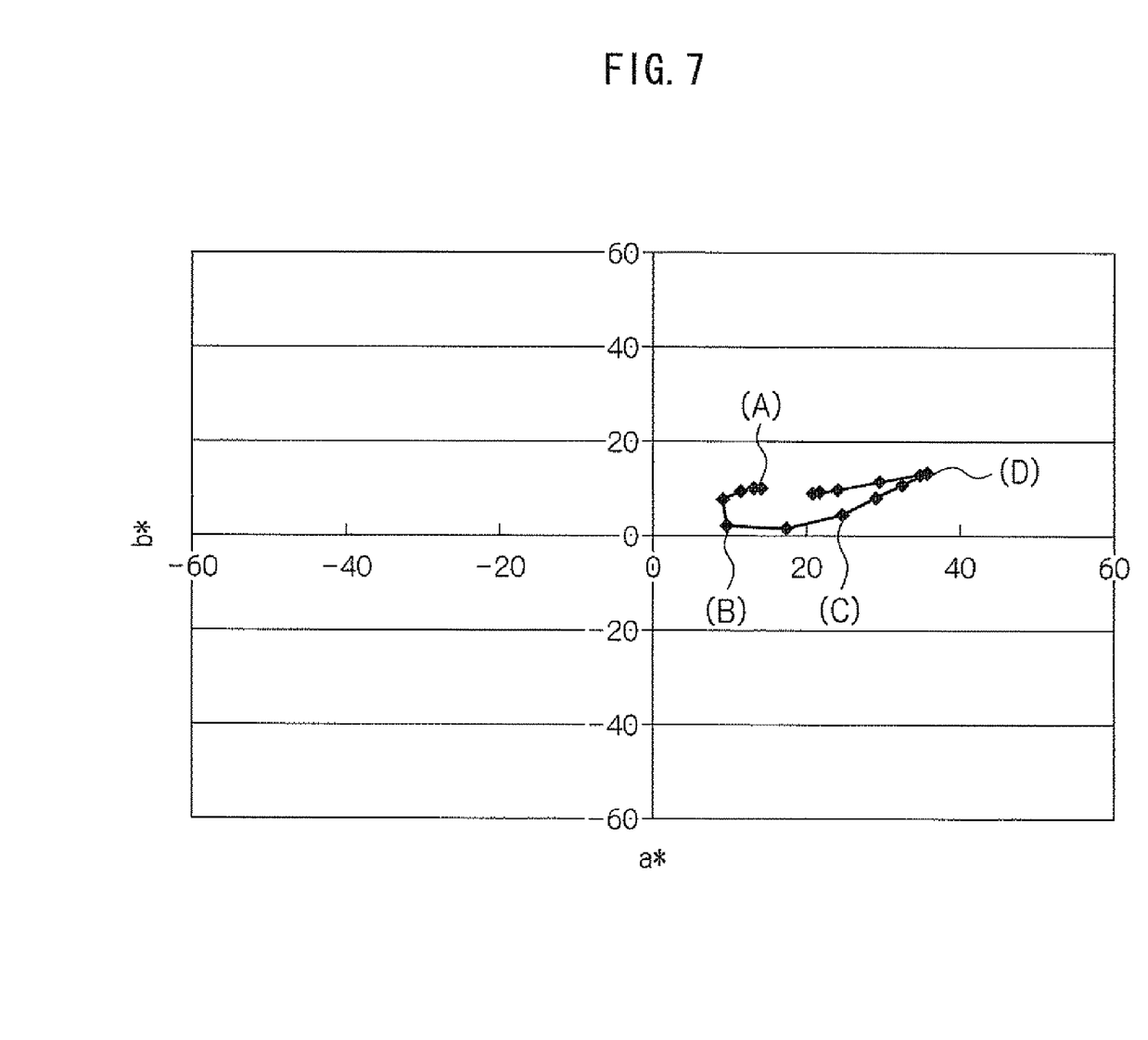
FIG. 7 is a graph showing the image densities (the values of a* and b*) when a voltage is applied between a pair of electrodes according to an exemplary embodiment of the invention.

Hereinafter, the color observed from the substrate 12 side when a red color filter is used as the color filter 21 is specifically described. FIG. 6 is a graph showing a relationship between the driving voltage and the light reflectivity, and FIG. 7 is a graph showing results (values of a* and b*) obtained by measuring the color density on the substrate 12 side with a densitometer (trade name: X-RITE 404A, manufactured by X-Rite Co.).

State (A): A mixed color of the color including light reflected at the planar-aligned liquid crystal layer 20B (light transmitted through the color filter) and the color including light reflected at the planar-aligned liquid crystal layer 20A (light not transmitted through the color filter) is observed, which is "white color (more precisely, reddish white color)".

State (B): A color including only light reflected at the planar-aligned liquid crystal layer 20A (light not transmitted through the color filter) is observed, which is "gray color (more precisely, reddish gray color)".

State (C): Since the liquid crystal layers 20A and 20B are each in a focal conic alignment, no reflected light is observed. Thus, the color of the light-shielding layer is observed, which is "black color".

State (D): A color including only light reflected at the planar-aligned liquid crystal layer 20B (light transmitted through the color filter) is observed, which is "red color".

Therefore, the liquid crystal display element of the exemplary embodiment of the invention may be configured to be able to display four or more colors. This is achieved even when the same type of liquid crystal composition is used in the liquid crystal layers 20A and 20B.

In the exemplary embodiment of the invention, the dielectric constants of the plural liquid crystal layers (liquid crystal layers 20A and 20B) disposed between a pair of electrodes are adjusted to be different from each other. However, the material (liquid crystal material) for constituting the liquid crystal 42 contained in each of the liquid crystal layers may be selected layer by layer, such that the dielectric constants of the liquid crystals 42 contained in the respective liquid crystal layers may themselves be adjusted to be different from each other.

In the exemplary embodiment of the invention, a configuration is described above, in which two liquid crystal layers (the liquid crystal layers 20A and 2013) are disposed as the plural liquid crystal layers between a pair of electrodes. However, the plural liquid crystal layers are not limited as far as the dielectric constants of the layers are adjusted to be different from each other. Therefore, the scope of the present invention also includes an exemplary embodiment in which three or more liquid crystal layers are included and the individual liquid crystal layers are separated from each other by color filters having mutually different colors.

Writing Element and Liquid Crystal Display Element

The following describes the writing device 11 for writing images in the liquid crystal display element 10, and the liquid crystal display device 17 provided with the liquid crystal display element 10 and the writing device 11.

As shown in FIG. 1, the liquid crystal display device 17 includes the writing device 11 and the liquid crystal display element 10. The writing device 11 includes the control unit 39 and the voltage applying device 28. The voltage applying device 28 is connected to the control unit 39 in such a manner that the unit 28 can send signals to the unit 30 and can receive signals therefrom.

In the exemplary embodiment, the voltage applying device 28 contains the voltage applying unit 28A.

The control unit 39 is constituted as a microcomputer containing a CPU (central processing unit), a ROM (read only memory), and a RAM (random access memory), and can control individual units inside the writing device 11.

The voltage applying device 28 is constituted such that it contains the voltage applying unit 28A. The voltage applying unit 28A is connected to the electrodes 16A and 16B of the liquid crystal display element 10 in such a manner that the voltage applying unit 28A may send signals to the electrodes 16A and 1613 and may receive signals therefrom. The voltage applying unit 28A applies voltage between the electrodes 16A and 16B.

In the writing device 11, a slot (not shown) is provided, into which the liquid crystal display element 10 is to be fitted. The writing device 11 is configured such that, when the liquid crystal display element 10 is fitted into the slot, the electrodes 16A and 16B of the liquid crystal display element 10 are electrically connected to the voltage applying unit 28A through a connector (not shown) provided at the slot.

The voltage applying device 28 is not limited as long as it is configured in such a manner that a voltage based on a signal inputted from the control unit 39 can be applied between the electrodes 16A and 16B of the liquid crystal display element 10. In order to enable quicker image display, it is preferable that the voltage applying unit 28 can attain AC-outputting and has a high through rate. The voltage applying device 28 may be, for example, a bipolar high-voltage amplifier.

In the liquid crystal display device 17 constructed as described above, a voltage is applied between the electrodes 16A and 1613 of the display element 24 from the voltage applying device 28 by the control of the control unit 39, whereby an image is formed in the liquid crystal display element 10.

As described above, the plural liquid crystal layers (liquid crystal layers 20A and 20B) disposed between the pair of electrodes 16A and 1613 of the liquid crystal display element 10 are prepared to have dielectric constants different from each other. For this reason, the plural liquid crystal layers (liquid crystal layers 20A and 20B) disposed between the pair of electrodes largely differ from each other in the threshold for changing between the focal conic and planar states. Accordingly, in the liquid crystal display device 17, by applying, to the electrodes 16A and 16B, a voltage by which the focal conic state or the planar state may be selectively generated based on the respective relationships between the applied voltage and the normalized light reflectivity of liquid crystal layers 20A and 2013 (refer to FIG. 5), it is possible to change only one of the liquid crystal layers 20A and 20B to a focal conic state or a planar state, and it is also possible to change both of them to a focal conic state or a planar state.

Control of Frequencies

The frequencies (wavelengths) of voltages applied between the electrodes 16A and 1613 from the voltage applying device 28 are preferably controlled by the control unit 39 (the frequency controlling device). In any of the states (A), (B), (C) or (D) shown in FIG. 6 and FIG. 7, a phenomenon occurs in which the light reflectivity rapidly increases at a particular wavelength (for example, a wavelength in the vicinity of 600 nm), and decreases at wavelengths less than this wavelength. This is because reflected light having wavelengths shorter than the wavelength in the vicinity of 600 nm are absorbed by the red color filter.

Accordingly, in order to display an image having a good color quality, it is preferable to apply a voltage having a long wavelength (low frequency) in the state (A) and to apply a voltage having a short wavelength (high frequency) in the states (B), (C) and (D).

The foregoing description of the exemplary embodiments of the present invention has been provided for the purposes of illustration and description. It is not limited to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A liquid crystal display element, comprising:
   a first substrate having a first electrode on one surface thereof;
   a transparent second substrate having a transparent second electrode on one surface thereof and being opposed to the first substrate such that the first electrode and the transparent second electrode are opposed to each other;
   a first liquid crystal layer containing a first liquid crystal composition and disposed between the first substrate and the transparent second substrate;
   a color filter disposed between the first substrate and the transparent second substrate, the color filter being disposed at a transparent second substrate side of the first liquid crystal layer; and
   a second liquid crystal layer containing a second liquid crystal composition and disposed between the first substrate and the transparent second substrate, and the second liquid crystal layer being disposed directly adjacent to a transparent second substrate side of the color filter,
   at least one of the first and second liquid crystal layers comprising an additive having dielectric properties, the dielectric constant of the first liquid crystal layer being different from that of the second liquid crystal layer.

2. The liquid crystal display element of claim 1, wherein the dielectric constant of the additive having dielectric properties is about $8.854 \times 10^{-10}$ F/m or more.

3. The liquid crystal display element of claim 1, wherein the additive having dielectric properties is at least one selected from $BaTiO_3$, $SrTiO_3$, $CaSnO_3$, $BaSnO_3$, $BaZrO_3$, $TiO_2$, $MgTiO_3$, $HfO_2$, or a Rochelle salt.

4. The liquid crystal display element of claim 1, wherein the volume-average particle diameter of the additive having dielectric properties is from about 5 nm to about 100 nm.

5. A liquid crystal display device, comprising:
   a first substrate having a first electrode on one surface thereof;
   a transparent second substrate having a transparent second electrode on one surface thereof and being opposed to the first substrate such that the first electrode and the transparent second electrode are opposed to each other;
   a first liquid crystal layer containing a first liquid crystal composition and disposed between the first substrate and the transparent second substrate;
   a color filter disposed between the first substrate and the transparent second substrate, the color filter being at a transparent second substrate side of the first liquid crystal layer;
   a second liquid crystal layer containing a second liquid crystal composition and disposed between the first substrate and the transparent second substrate, the second liquid crystal layer being disposed directly adjacent to a transparent second substrate side of the color filter, and the dielectric constant of the second liquid crystal layer being different from that of the first liquid crystal layer; and
   a voltage applying device that applies voltage between the first electrode and the transparent second electrode,
   at least one of the first and second liquid crystal layers comprising an additive having dielectric properties.

6. The liquid crystal display device of claim 5, further comprising a frequency controlling device that controls the frequency of voltage applied from the voltage applying device.

* * * * *